United States Patent [19]  [11] Patent Number: 4,650,446
Pinto et al.  [45] Date of Patent: Mar. 17, 1987

[54] DRIVE BELTS

[75] Inventors: Gideon Pinto, Carmiel; Jonathan Schanin, Haifa, both of Israel

[73] Assignee: Volta Power Belting Ltd., B'Nai Brak, Israel

[21] Appl. No.: 706,838

[22] Filed: Feb. 28, 1985

[30] Foreign Application Priority Data

Mar. 8, 1984 [IL] Israel .................................. 71191

[51] Int. Cl.$^4$ .............................................. F16G 3/00
[52] U.S. Cl. ..................................... 474/253; 474/255
[58] Field of Search ................................ 474/253–257

[56] References Cited

U.S. PATENT DOCUMENTS

| 2,733,181 | 1/1956 | Riedesel | 474/254 X |
| 3,744,095 | 7/1973 | Tomlinson | 474/255 X |
| 4,298,343 | 11/1981 | Redmond, Jr. | 474/255 |

FOREIGN PATENT DOCUMENTS

| 1099222 | 9/1960 | Fed. Rep. of Germany . | |
| 2232337 | 1/1973 | Fed. Rep. of Germany | 474/254 |
| 2920904 | 11/1980 | Fed. Rep. of Germany . | |
| 1154067 | 4/1958 | France . | |
| 1322314 | 2/1962 | France . | |
| 2145163 | 2/1973 | France . | |
| 2150127 | 3/1973 | France . | |
| 2458718 | 2/1981 | France . | |
| 1279934 | 6/1972 | United Kingdom . | |

OTHER PUBLICATIONS

Patent Abstracts of Japan, vol. 7, No. 74 (M-203) [1219], Mar. 26, 1983; & JP-A-58 652 (Nippon Oil Seal Kogyo K.K.) 05-01-1983.

Primary Examiner—Stephen J. Novosad
Assistant Examiner—Thuy M. Bui
Attorney, Agent, or Firm—Oblon, Fisher, Spivak, McClelland & Maier

[57] ABSTRACT

An assembly and a method for producing an endless transmission belt is disclosed herein. The assembly comprises an open-ended belt of indeterminate length made of a thermoplastic elastomer and having reinforcing means extending through the entire length thereof. The belt is cut to a required length and its two ends are connected in a permanent joint to form an endless transmission belt. The assembly further comprises joining means to produce the permanent joint, which joining means is in the form of an elongated splicing member made of a thermoplastic elastomer and having reinforcing means extending through at least a major portion of the length thereof. The splicing member is introducible, in a direction substantially perpendicular to the longitudinal axis of the belt, into a recessed zone of limited longitudinal extent providable in both end portions of the belt, and is permanently bondable to the belt. When the splicing member is thus introduced into, and bonded to, the belt, the reinforcing means of the splicing member are substantially co-planar with the reinforcing means of the belt.

22 Claims, 17 Drawing Figures

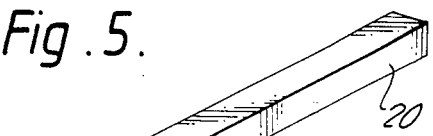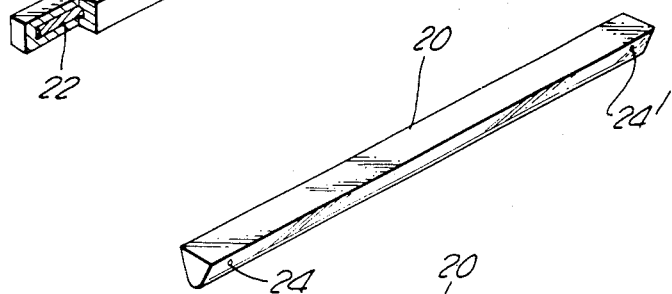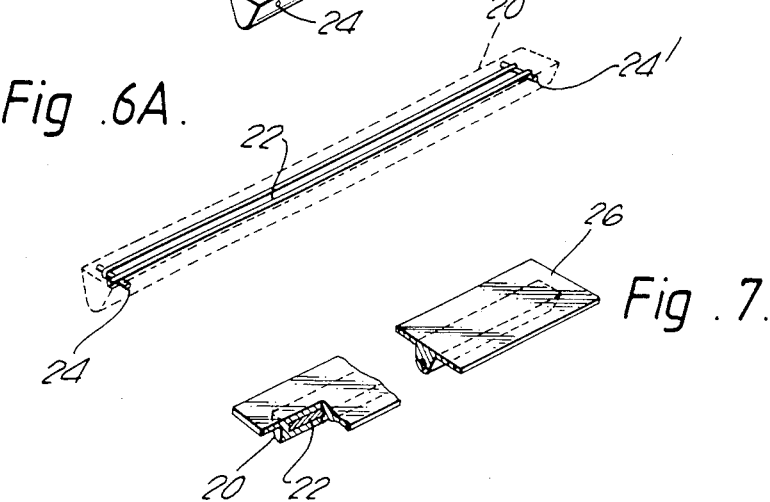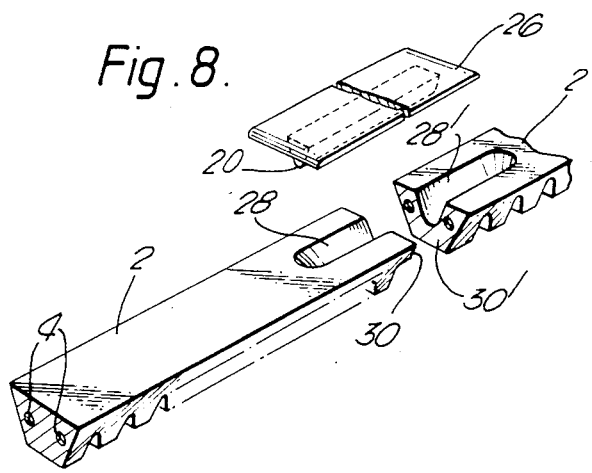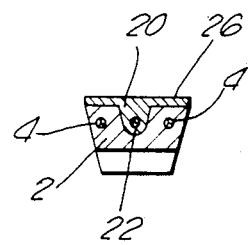

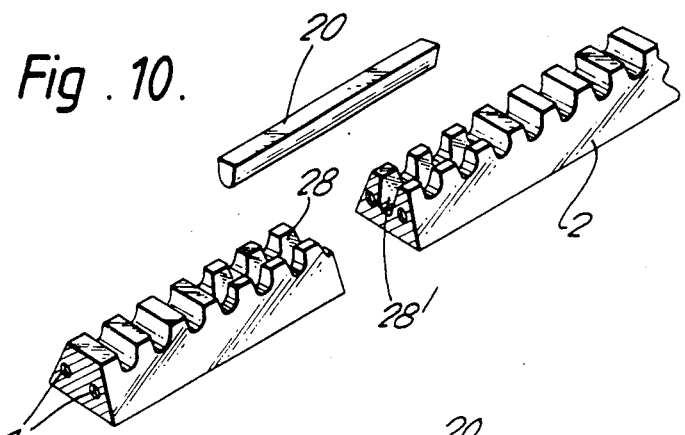
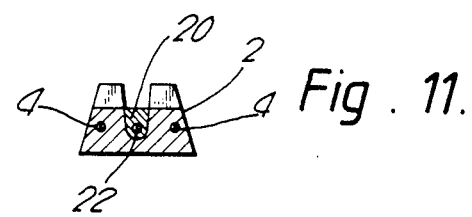
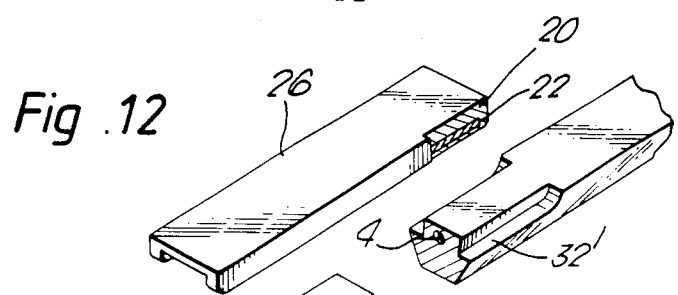
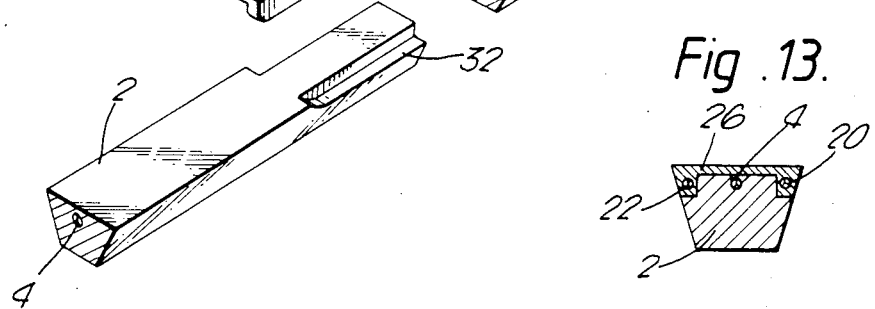
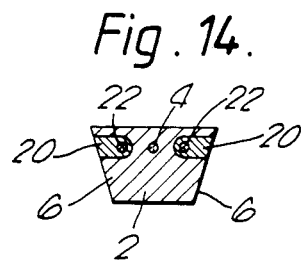
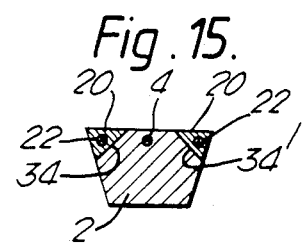
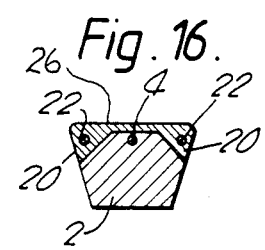

DRIVE BELTS

FIELD OF THE INVENTION

The present invention relates to a reinforced open-ended drive or transmission belt and to endless transmission belts producible from this open-ended belt. The invention also relates to a method for producing such endless belts from such open-ended belts.

BACKGROUND OF THE INVENTION

There are known various forms of open-ended belts which have a body element provided with reinforcing elements. There are known various means for converting such open-ended belts to endless belts. Most of the conventional means have drawbacks, and do not provide the smooth and long-lasting endless belts as required for power transmission.

In U.S. Pat. No. 3,808,901, Berg, there is described a method of forming an endless belt by joining the steel cable ends of the belt to each other by a crimped bushing. Such splicing results in reduced power and service-life ratings compared with V-belts known in the art.

Another U.S. Pat. No. 4,437,849, Berg, discloses what he describes as emergency replacement for a regular drive or timing belt. The belt has along its entire length a (female) groove, the bottom of which is provided with ratchet-type teeth. A (male) connector piece having matching ratchet-type teeth is axially introduced into the ends of the belt and, engaging the teeth of the groove, holds the two ends together. This belt is of low lateral rigidity, because of the substantial width and depth of the open groove, which is bound to seriously impair its power transmission capacity. It further suffers from dynamic imbalance caused by the mass of the connector piece, and its usefulness is at best temporary, in the words of the inventor, "to permit the motorist [whose fan belt broke] to drive a sufficient distance to reach a garage for regular belt replacement."

An equally temporary relief is offered by the "Emergency belting and kit" disclosed in U.S. Pat. No. 4,336,021 which proposes a rigid insert that is screwed into the tubular ends of the belt.

U.S. Pat. No. 4,366,014, Pollard, describes a method of splicing belts by application of heat and pressure, utilizing the principle of overlapping the reinforcing members in two layers, with the inherent drawback of having a stiff section at the splice and reduced durability in flexing.

A similarly stiff joint is produced by the method according to German Patent No. 29 20 904, Norddentsche Seekabelwerke A.G., which uses a heavy and expensive piece of equipment to fuse the overlapping ends of the belt.

OBJECTS OF THE INVENTION

It is one of the objects of the present invention to provide a length of cord-reinforced, open-ended transmission belt which, with the aid of single tools and using a reinforced, flexible splicing member, can be turned into an endless belt with uniform flexural properties throughout its entire length, in which the reinforcing elements are not exposed at any point and whose performance is comparable to that of conventional endless belts.

SUMMARY OF THE INVENTION

This the invention achieves by providing an assembly for producing an endless transmission belt comprising an open-ended belt of indeterminate length, made of a thermoplastic elastomer and having at least one reinforcing means extending through the entire length thereof, said belt being adapted to be cut to a required length and to have its two ends connected in a permanent joint, to form an endless transmission belt, and joining means to produce said permanent joint, characterized in that said joining means is at least one elongated splicing member made of a thermoplastic elastomer and having at least one reinforcing means extending through at least a major portion of the length thereof, that said at least one reinforcing means is provided with means for resisting longitudinal movement of said at least one reinforcing means in said at least one elongated splicing member, that at least a portion of said splicing member is introducible, in a direction substantially perpendicular to the longitudinal axis of said belt, into at least one recessed zone of limited longitudinal extent providable in both end portions of said belt in a direction substantially parallel to the longitudinal axis of said belt, and is permanently bondable to said belt, and that, when said splicing member is thus introduced into, and bonded to, said belt, the reinforcing means of said splicing member are substantially co-planar with the reinforcing means of said belt.

The invention further provides a method for producing endless transmission belts from pieces of open-ended belts, comprising the steps of:

providing an elongated splicing member made of a thermoplastic elastomer and having at least one reinforcing means extending through at least a major portion of the length thereof;

cutting said piece to the length required;

producing at least one recessed zone of limited longitudinal extent in each of the end portions of said belt;

introducing, in a direction substantially perpendicular to the longitudinal axis of said belt, at least a portion of said splicing member into said recessed zone, and bonding said splicing member to said recessed zones, whereby said end portions are fixedly joined and said open-ended belt is turned into an endless belt, while the reinforcing means of said splicing member are rendered coplanar with the reinforcing means of said belt.

BRIEF DESCRIPTION OF THE DRAWINGS

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5 represents a first embodiment of the splicing member according to the invention;

FIGS. 6 and 6A illustrate the outside look and inside structure, respectively, of another embodiment of the splicing member;

FIG. 7 shows yet another embodiment of the splicing member;

FIG. 8 shows the two ends of a belt according to FIG. 2 with the recessed zones prepared at the upper surface of the belt and the splicing member ready for introduction;

FIG. 9 is a cross-sectional view of the belt of FIG. 8 after splicing;

FIG. 10 represents a belt according to FIG. 2 with the recessed zones cut at the lower surface of the belt and the splicing member ready for introduction;

FIG. 11 is a cross-sectional view of the belt of FIG. 10 after splicing;

FIG. 12 represents a belt with recessed zones in the form of reentrant edges and the splicing member ready for introduction;

FIG. 13 is a cross-sectional view of the belt of FIG. 12 after splicing;

FIG. 14 llustrates in a cross-sectional view an embodiment with two splicing members located in the working flanks of the belt;

FIG. 15 is a cross-sectional view of another embodiment with two splicing members, in which the recessed zones are in the form of chamfers, and FIG. 16 is a cross-sectional view of a variant of the embodiment of FIG. 15, in which the two splicing members are integral with a common top member.

DETAILED DESCRIPTION OF THE PREFERRED EMBODIMENTS

Figure 1:
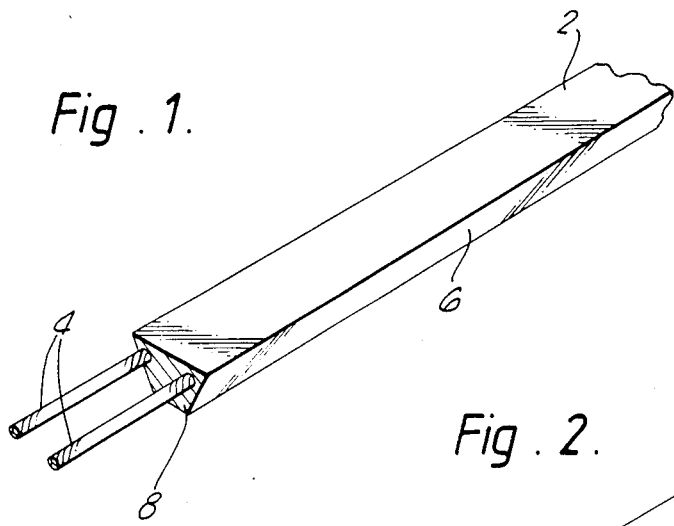
FIG. 1 is a perspective view showing a length of plain V-belt according to the invention.
Figure 2:
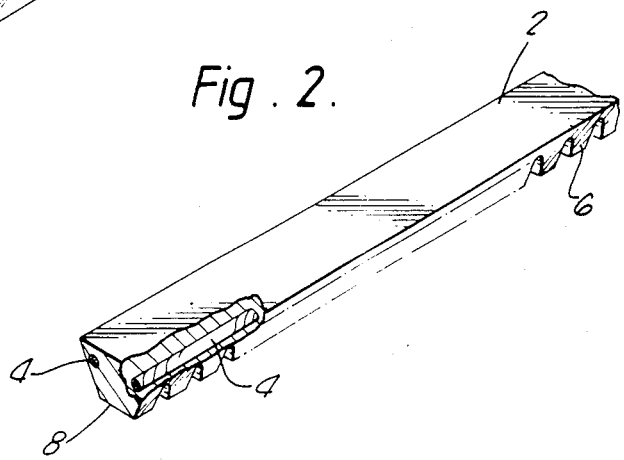
FIG. 2 is a perspective view representing a cogged V-belt.

Referring now to the drawings, there are seen in FIGS. 1 and 2 two basic types of belts according to the invention, a plain V-belt (FIG. 1) and a V-belt cogged for greater flexibility and reduced losses (FIG. 2). The belts are comprised of a body 2 made of a thermoplastic elastomer such as a thermoplastic polyurethane, and one or more load-carrying reinforcing members 4 embedded in, and extending throughout, the length of the belts, which reinforcing members 4 consist of high-strength twisted or braided cords made of such synthetic materials as polyester or aramide. Prior to embedding, the reinforcing members or cords 4 are advantageously coated with e.g., a polyurethane adhesive and may also be thermally treated for improved mechanical properties. Unlike in conventional endless belts, the cords are positioned parallel to the longitudinal direction of the belt rather than being helically wound. No reinforcement elements are exposed, and thus belts according to the invention exhibit superior properties of abrasion resistance, and endurance in oily and wet environments. This construction is advantageous compared to that of the "raw edge" endless rubber V-belts, where due to the manufacturing process of winding the tension cord, there always exists an exposed and unprotected cord.

As in conventional V-belts, the belt flanks 6 include an angle with one another, causing the belt to firmly wedge into the groove of the sheave or pulley, so that power transmission is effected by the flanks 6 of the belt rather than by its bottom surface 8, which is not in contact with the sheave at all.

Figure 3:
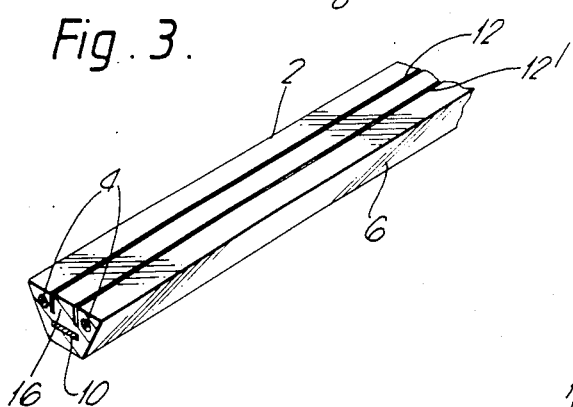
FIG. 3 shows a variant of the V-belt of FIG. 1, in which an embedded tape and a pair of factory-provided slots enable easy preparation of the recessed zone.
Figure 4:
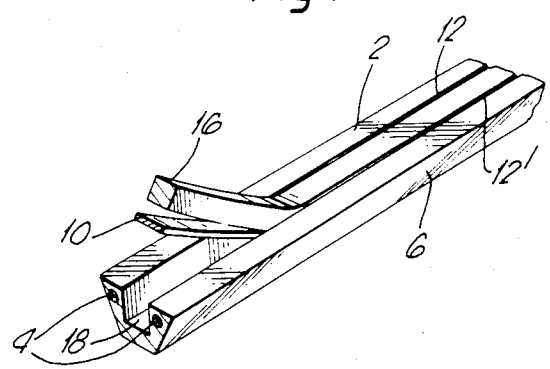
FIG. 4 shows the recessed zone being prepared by peeling off a length of the central belt portion.

Another type of belt according to the invention is shown in FIGS. 3 and 4. As already mentioned, the present invention provides for the ends of a piece of open-ended belt, cut to the required length, to be joined by means of a splicing member, discussed in detail further below, to be introduced into a recessed zone to be prepared in these ends. These zones, as will be shown, may have various forms, one of them being a groove of limited length. In the belt of FIGS. 3 and 4, preparation of such grooves is very much simplified by introducing, during manufacture, a tape 10 extending along the entire length of the belt. Further provided during the manufacturing process are two narrow slots 12, 12' equally extending along the entire belt length and of a depth slightly less than the depth at which the tape 10 is embedded. All that needs to be done to prepare the groove is to use a sharp cutting tool such as a utility knife, to deepen the slots 12, 12' down to the tape 10 and, with an upward motion, pull away or peel off the section 16, as clearly seen in FIG. 4. The length of section 16 to be removed is obviously determined by the length of the groove 18 required.

FIGS. 5 to 7 illustrate a first group of splicing members according to the invention.

The splicing member of FIG. 5 has a body 20 of rectangular cross section, in which is firmly embedded a reinforcing cord 22 which, as can be seen in the sectioned portion, is slightly shorter than the body 20, so that the ends of the cord 22 are not exposed. A splicing member of this type would be suitable for the belt of FIG. 3.

Another splicing member is shown in FIGS. 6 and 6A. Here, the body 20 has a tapering cross section, and the reinforcing cord 22 is wound in a number of loops around two anchoring pins 24, 24' which, together with the cord loops, are embedded in the splicing-member body 20. Such an arrangement is superior as regard pull-out resistance, as there is a better mechanical grip of the body material on the cords. The anchoring pins 24, 24' may also be located in a nonhorizontal plane.

Yet another splicing member is illustrated in FIG. 7. Here, the body is also tapering and contains, embedded, a single reinforcing cord 22 which, as in the embodiment of FIG. 5, is slightly shorter than the body 20. Integral with the latter is a top plate 26 which is advantageously longer than the body 20 and as wide as the belt to be spliced by it (see, e.g., FIG. 9).

In all types of splicing members, the body 20 (and top plate 26, if provided) are made of a thermoplastic elastomer such as thermoplastic polyurethane, and the cord 22 may be a twisted polyester cord possibly, but not necessarily, of the same type as the reinforcing cords 4 of the belt. The cords 22 are also advantageously given a coating of any suitable adhesive prior to their embedding in the body 20.

The following drawings illustrate the way in which the various types of splicing-members are used to join the ends of open-ended belts to produce endless transmission belts.

The process starts with cutting a piece of belt to the required length. Then, turning to FIG. 8, the recessed zones are prepared which, in this particular embodiment, are tapering grooves 28, 28' long enough, together, to accommodate tne body 20 of the splicing member shown above the belt ends, which is of the type illustrated in FIG. 7. The grooves 28, 28' are easily produced by milling or routing.

The next step is preferably the butt-welding of the belt ends 30, 30' to each other, not so much for the strength of the eventual joint (which is largely dependent on the splicing member), but for proper alignment and complete sealing off of the reinforcing members. Welding, or rather fusing, at this stage and subsequent stages is performed in a manner, and by means, as such known, such as the application of hot plates of appropriate shape, hot air, radiant heat, or the like.

The next step is to weld the body 20 of the splicing member into the grooves 28, 28' and the top plate 26 to the top surface of tne body 2. This is best done by pre-melting the groove and belt-top surfaces and then introducing the similarly preheated splicing member into the now aligned grooves 28, 28', wnile exerting reasonable pressure.

The joint is now complete and can be seen in cross section in FIG. 9, from which it is also clear that the reinforcing cords 4 in the body 2 and the reinforcing cord 22 of the splicing member are in the same plane. If the grooves 28, 28' are milled in the axial direction of the body 2, the reinforcing cord 22 will also be parallel to the belt cords 4. The splicing member is thus able to transmit tension forces from belt cords 4 of one belt end to the other via shear stresses in the elastomer belt matrix and via the splicing-member cord or cords 22 embedded in the splicing-member matrix.

In a variant of the embodiment of FIG. 8, the top plate 26 is separate, rather than integral with the body 20. The top plate 26 which, as shown, projects above the belt surface, may also be flush with this surface when an appropriate recess is prepared at the milling or routing stage. In some cases it may be sufficient only to weld the top plate 26, enough melt flowing also around the body 20 to provide an adequate grip.

FIG. 10 shows a cogged belt, in which a top-plate-less splicing-member body 20 is introduced into grooves 28, 28' provided at the lower, narrow, part of the belt 2. The spliced belt is shown in cross section in FIG. 11, where it is again seen that the belt cords 4 and the splice-member cord 22 are in the same plane.

The splicing member of the arrangement shown in FIG. 12 is designed to straddle the belt 2, to which end the recessed zones in the belt ends are in the form of reentrant edges 32, 32' of the belt profile, also prepared by milling or routing. In this case, the channel-like splicing member has two reinforcing cords 22, each embedded in a body 20 which are linked by a top plate 26. The cross section of the finished splice is seen in FIG. 13.

Another joint is seen in FIG. 14, where a splicing-member body 20 is introduced into a groove provided in each of the flanks 6 of the belt 2.

In the joint illustrated in FIG. 15 the recessed zones are chamfers 34, 34' provided in the end portions of the belt 2, and the two splicing members have bodies 20 of a triangular cross section, complementing the trapezoidal belt profile.

In a variant of this embodiment, illustrated in FIG. 16, the two triangular bodies 20 are joined by a common top plate 26.

Although bonding by welding or fusing will give optimum results, the use of appropriate adhesives may be adequate for many light-duty applications.

While the embodiments discussed in this specification are all of the V-belt type, it should be clear that the present invention is also applicable to other belt types such as timing belts, flat belts, or the like. Furthermore, the belts need not be of a uniform material composition throughout their cross section. Thus the lower portion of a V-belt profile may consist of polyurethane foam, which would have the same flexibility-enhancing effect as the cogs of the cogged belt.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An assembly for producing an endless transmission belt, said assembly comprising:
   (a) an open-ended belt of indeterminate length, made of a thermoplastic elastomer, and having at least one reinforcing means extending through the entire length thereof, said belt being adapted to be cut to a required length and to have its two ends connected in a permanent joint to form an endless transmission belt, and
   (b) joining means to produce said permanent joint, said assembly characterized in that:
   (c) said joining means comprises at least one elongated splicing member made of a thermoplastic elastomer and having at least one reinforcing means extending through at least a major portion of the length thereof;
   (d) said at least one reinforcing means of said at least one elongated splicing member is provided with a pull-out resistant means;
   (e) at least a portion of said at least one elongated splicing member is introducible, in a direction substantially perpendicular to the longitudinal axis of said belt, into at least one recessed zone of limited longitudinal extent providable in both end portions of said belt in a direction at least substantially parallel to the longitudinal axis of said belt, and is permanently bondable to said belt; and
   (f) when said at least one elongated splicing member is thus introduced into, and bonded to, said belt, said at least one reinforcing means of said splicing member is at least substantially co-planar with said at least one reinforcing means of said belt.

2. The assembly as claimed in claim 1, wherein the reinforcing means of said belt is a cord made of a synthetic fiber.

3. The assembly as claimed in claim 1, wherein said recessed zone is in the form of a groove located in the plane of symmetry of the belt profile.

4. The assembly as claimed in claim 1, wherein said recessed zone is in the form of at least one re-entrant edge of the belt.

5. The assembly as claimed in claim 1, wherein said recessed zone is in the form of at least one chamfer across an edge of said belt.

6. The assembly as claimed in claim 1, wherein said recessed zone is in the form of a groove provided in at least one of the flanks of said belt.

7. The assembly as claimed in claim 1, wherein the reinforcing means of said splicing member is a cord made of a synthetic fiber and is completely embedded in said splicing member.

8. The assembly as claimed in claim 7, wherein said cord is looped around anchoring pins located adjacent to each of the ends of said splicing member.

9. The assembly as claimed in claim 1, wherein said splicing member is comprised of a body adapted to fit said recessed zone and accommodating said reinforcing means, and of a top plate integral with said body.

10. The assembly as claimed in claim 9, wherein said top plate is of a width substantially equal to the major width of said belt.

11. The assembly as claimed in claim 4, wherein said splicing member has a channel-like profile straddling said belt at said recessed zones, said reinforcing cords being embedded in the wings of said channel-like profile.

12. The assembly as claimed in claim 1, wherein at least one surface of said belt has at least one longitudinal, strip-like portion pre-weakened by the provision of a tape inside said belt and two longitudinal slots, the slots penetrating said surface and ending in proximity of one edge each of said tape, to facilitate easy peeling off of a length of said portion.

13. A method for producing endless transmission belts from pieces of open-ended belts, said method comprising the steps of:
   (a) providing a piece of undeterminate length of open-ended belt made of a thermal plastic elastomer and having at least one reinforcing means extending through the entire length thereof;
   (b) providing an elongated splicing member made of a thermoplastic elastomer and having at least one reinforcing means extending through at least a major portion of the length thereof, said at least one reinforcing means being provided with pull-out resistant means;
   (c) cutting said piece to the length required;
   (d) producing at least one recessed zone of limited longitudinal extent in each of the end portions of said belt extending in a direct at least substantially parallel to the longitudinal axis of said belt;
   (e) introducing, in a direction substantially perpendicular to the longitudinal axis of said belt, at least a portion of said elongated splicing member into said at least one recessed zone; and
   (f) bonding said elongated splicing member to said at least one recessed zone, whereby said end portions are fixedly joined and said open-ended belt is turned into an endless belt, while said at least one reinforcing means of said elongated splicing member is rendered at least substantially co-planar with said at least one reinforcing means of said belt.

14. The method as claimed in claim 13, wherein said recessed zone is produced by a machining operation.

15. The method as claimed in claim 13, wherein said recessed zone is produced by peeling off a pre-weakened longitudinal portion of one of the belt surfaces.

16. The method as claimed in claim 13, wherein bonding is effected by the application of heat.

17. The method as claimed in claim 13, wherein bonding is effected by the application of an adhesive.

18. An assembly for producing an endless transmission belt, said assembly comprising:

(a) a belt of indeterminate length, said belt having a longitudinal axis, being made of a thermoplastic elastomer, and having at least one reinforcing cord embedded therein and extending through the entire length thereof, and
(b) first means for joining two end surfaces of said belt together to form an endless transmission belt after said belt has been cut to the required length and has had at least one elongated groove formed in a periphery surface of said belt communicating with each of the end surfaces and in a direction at least substantially parallel to the longitudinal axis of said belt, said at least one elongated groove communicating with each of the end surfaces being in communication with and at least substantially parallel to a corresponding elongated groove communicating with the other one of the end surfaces when said end surfaces are placed in planar abutment, said first means comprising:
   (i) at least one elongated splicing member having a longitudinal axis and two opposing end surfaces, said at least one elongated splicing member being made of a thermoplastic elastomer and being sized and shaped to fit in and to at least substantially fill said at least one elongated groove communicating with each of the end surfaces of said belt;
   (ii) at least one reinforcing cord embedded in said at least one elongated splicing member and extending in the direction of the longitudinal axis of said at least one elongated splicing member; and
   (iii) second means for resisting longitudinal movement of said at least one reinforcing cord embedded in said at least one elongated splicing member.

19. An assembly as recited in claim 18 wherein:
(a) said second means comprise two spaced anchoring pins disposed in said at least one elongated splicing member at least substantially perpendicular to the longitudinal axis of said at least one elongated splicing member and
(b) said at least one reinforcing cord embedded in said at least one elongated splicing member is wound around said two spaced anchoring pins.

20. An assembly as recited in claim 18 and further comprising a tape embedded in said belt and extending at least substantially parallel to the longitudinal axis of said belt, said tape being sized, shaped, and positioned such that pulling said tape out of said belt creates said at least one elongated groove.

21. An assembly as recited in claim 20 wherein longitudinally extending narrow slots formed in the peripheral surface of said belt facilitate pulling said tape out of said belt to create said at least one elongated groove.

22. An assembly as recited in claim 18 wherein, when said first means is disposed in said at least one elongated groove in said belt, said at least one reinforcing cord embedded in said belt and said at least one reinforcing cord embedded in said at least one elongated splicing member are both disposed in a plane that is at least substially parallel to the peripheral surface of said at least one elongated splicing member.

* * * * *